United States Patent [19]

Sassa

[11] Patent Number: 5,160,773
[45] Date of Patent: Nov. 3, 1992

[54] ENCAPSULATED FELT
[75] Inventor: Robert L. Sassa, Newark, Del.
[73] Assignee: W. L. Gore & Associates, Inc., Newark, Del.
[21] Appl. No.: 746,681
[22] Filed: Aug. 16, 1991
[51] Int. Cl.[5] .......................... B32B 1/04; B32B 3/26; D04H 1/08
[52] U.S. Cl. ......................................... 428/76; 428/74; 428/222; 428/280; 428/311.5; 428/316.6; 428/422; 156/185
[58] Field of Search .................. 428/74, 76, 222, 280, 428/311.5, 316.6; 156/185

[56] References Cited

U.S. PATENT DOCUMENTS 3,223,564 1/1962 Buschman et al. ................ 156/185
4,983,434 1/1991 Sassa ................................ 428/311.5

Primary Examiner—George F. Lesmes
Assistant Examiner—Kathryne E. Shelborne
Attorney, Agent, or Firm—Samuels, Gary A.

[57] ABSTRACT

A sealing material of polytetrafluoroethylene felt is encapsulated by a polytetrafluoroethylene sheet coated with a thermoplastic fluoropolymer.

9 Claims, 3 Drawing Sheets

ENCAPSULATED FELT

FIELD OF THE INVENTION

This invention relates to an encapsulated felt for use as a sealant material.

BACKGROUND OF THE INVENTION

Felt materials have been used commonly in industrial applications. They possess good dimensional stability. They can be made with a wide variety of natural or synthetic fibers to withstand the mechanical, chemical and thermal requirements required by the application.

Felts constructed with PTFE fibers possess superior chemical and thermal resistance and possess desirable mechanical properties, especially low coefficient of friction.

Some applications using PTFE felt require a seal across a pressure differential. The seal requires resistance to solid or liquid penetration of the felt. Current felts are too porous and will allow particulate, liquid and gases to penetrate.

The present invention attempts to retain the good physical, mechanical and chemical properties of PTFE felts while preventing penetration of liquids and solids through the felt.

One use of felt sealing materials is in a rotating perforated drum for separating solid particulate from a liquid which needs to be sealed at the drum edges in order to prevent solids or liquids from being drawn in the stationary drive areas.

This invention provides a novel material for sealing the area between such a rotating drum and the stationary drive housing.

SUMMARY OF THE INVENTION

A sealing material of polytetrafluoroethylene felt encapsulated in a tape of polytetrafluoroethylene having a layer of thermoplastic fluorinated polymer on one side of said tape, said tape having the thermoplastic fluorinated polymer adjacent the felt.

DETAILED DESCRIPTION OF THE INVENTION

The felt used herein is made of short fibers, i.e. staple fibers, of polytetrafluoroethylene (PTFE). Preferably the PTFE will be porous PTFE and most preferably expanded porous PTFE. The felt can be prepared by the needle punching of staple fibers as described in Louterbach U.S. Pat. No. 2,893,105 and the felt used in the present invention may sometimes be referred to herein as needle punched felt.

Figure 1:
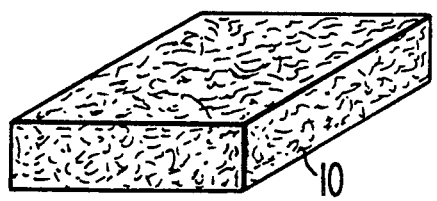
FIG. 1 depicts a layer of felt 10 used in the invention.
Figure 2:
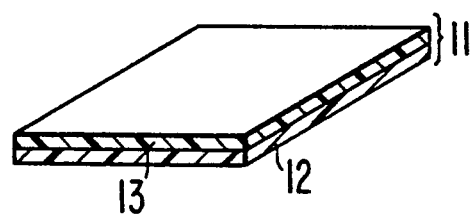
FIG. 2 depicts a laminated sheet 11 made of sheet 12 and thermoplastic fluoropolymer 13.
Figure 3A:
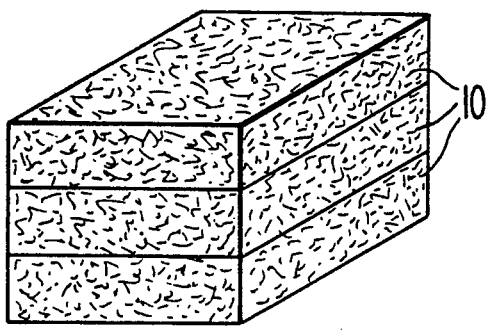
FIGS. 3a, 3b and 3c depict several layers of felt 10.
Figure 3B:
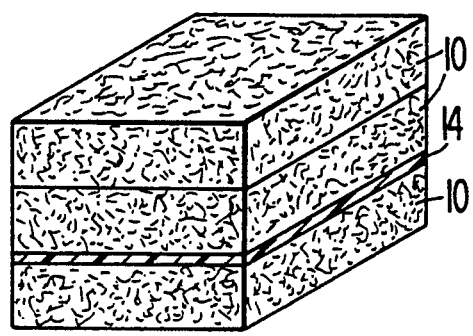
Figure 3C:
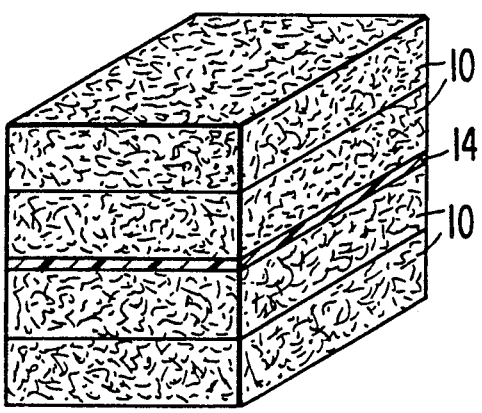
Figure 4:
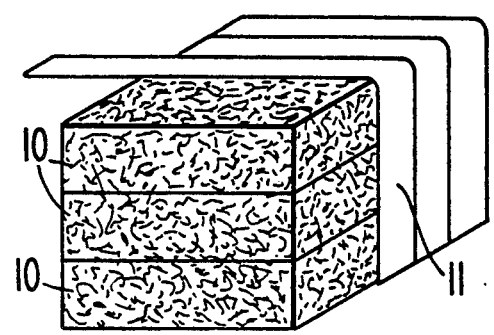
FIG. 4 depicts several layers of felt 10 partially wrapped with laminated sheet 11.

The felts 10 (FIG. 1) are ordinarily 1/16 to ⅛ inch thick and they can be used as such in this invention or several layers of felts can be employed one on top of the other to form layers of any desired height, as for example, ¼ inch, ⅜ inch or the like. The felts can be any width, but preferably are ½ inch to 40 inches wide or more; and any length, preferably 6 inches up to 10 feet to 50 feet or more. When several of the thinner felts are so layered, as in FIGS. 3a, 3b and 3c, the entire assembly is preferably needle punched on one side, or on both, as desired, to provide cohesiveness to the assembly. In one embodiment, 17 ply of felt sheets are used. In FIG. 3a, several layers of felt 10 are layered together. The felt layers may have a scrim added for increase strength, if desired. In FIG. 3b, scrim 14 is attached to one of the adjacent layers 10. In FIG. 3c, scrim 14 is positioned in one of the layers 10. A scrim, if used, can be present adjacent each layer 10, or can be present in alternating or a few layers 10, or can be present, as shown, with only one layer 10. The scrim, when used, can be any strengthening scrim but preferably is made of woven PTFE fibers, and most preferably is made of woven porous expanded PTFE fibers.

The polytetrafluoroethylene (PTFE) tape is a sheet of PTFE. As stated above, preferably, it is porous. By "porous" is meant that the sheet has continuous pores extending from one side of the membrane to the other. The sheet can be prepared by a number of different known processes. Porous sheets are preferably prepared by expanding polytetrafluoroethylene as described in U.S. Pat. Nos. 4,187,390; 4,110,392; and 3,953,566, to obtain expanded porous polytetrafluoroethylene. The pores are micropores formed by the nodes and fibrils of the expanded PTFE.

The staple used in the felt can be made by slitting sheets into fibers and then chopping the resulting fibers into staple.

To prepare the tape of PTFE, a sheet of polytetrafluoroethylene is laminated on one side with a film of a thermoplastic fluoropolymer, preferably a film of a copolymer of tetrafluoroethylene and hexafluoropropylene (Teflon ® FEP fluoropolymer), using heat and pressure. Again, the sheet of PTFE is preferably porous PTFE, and most preferably expanded porous PTFE.

The laminated sheet is wrapped securely around the felt assembly with the thermoplastic fluoropolymer side toward the felt. The wrapped felt is then heated to melt the thermoplastic fluoropolymer (270° C. for Teflon FEP fluoropolymer) and bond it to the fibers of the felt.

The encapsulated felt so prepared is impermeable to liquids and gases, and has a low coefficient of friction and a low coefficient of thermal expansion. It is conformable to curved surfaces and provides a strong, tough, assembly. The density of the assembly is between about 1 gm/cc and 2.2 gm/cc.

Figure 5:
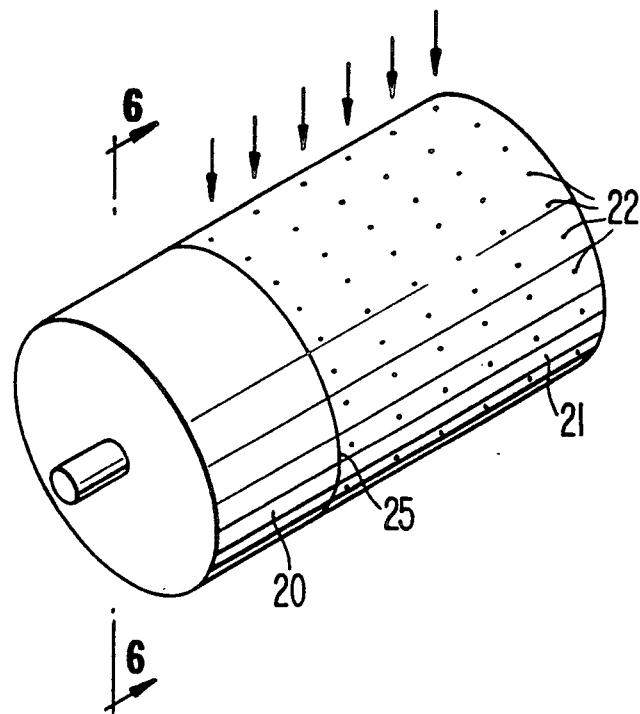
FIG. 5 is perspective view of a rotating filtration drum assembly.

One use of the encapsulated felt of the invention is as a sealant material, especially to seal the inside of one stationary housing from the inside of an abutting rotating housing. Such a housing arrangement is depicted in FIG. 5. Stationary housing 20 contains drive elements (not shown) for driving rotating drum 21. Drum 21 contains a multiplicity of perforations 22. Such an apparatus will have an entry means (not shown) for passing a particulate-laden liquid into contact with the drum 21 in the direction of the arrows in FIG. 5. The liquid passes through the perforations and can be withdrawn from the drum interior by exit means (not shown).

Figure 6:
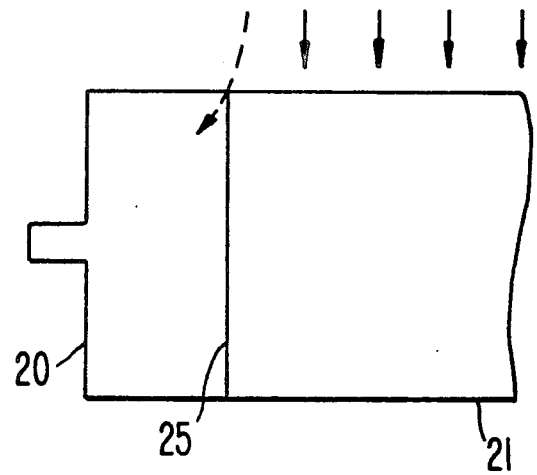
FIG. 6 is cutaway view of the assembly of FIG. 5 taken along line 6—6 of FIG. 5.
Figure 8:
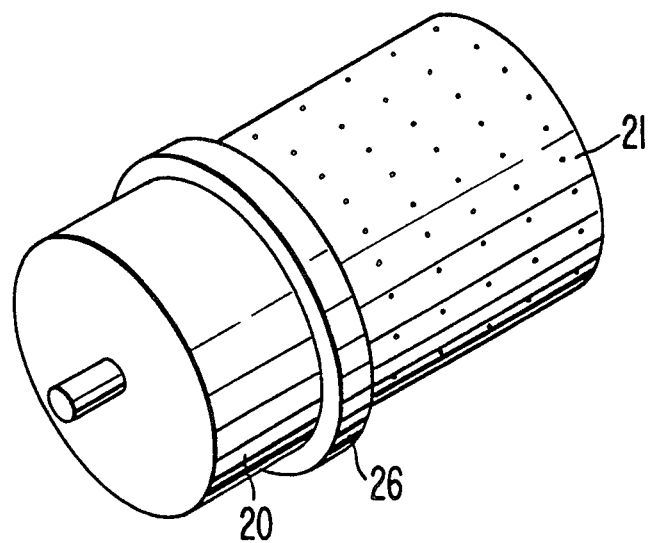
FIG. 8 shows the sealant circumferentially around the outside of the assembly depicted in FIGS. 5, 6 and 7.
Figure 7:
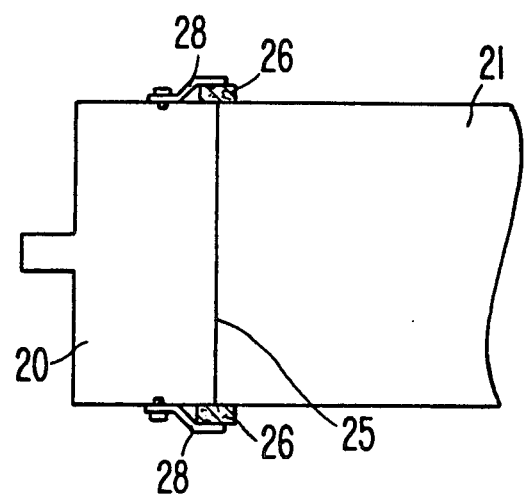
FIG. 7 is the same as FIG. 6 but shows a sealant material covering the interface of the housing and drum.

FIG. 6 depicts a cutaway side view of the housing. Liquid with particulate passes in the direction shown by the solid line arrows. Unless the interface 25 between stationary housing 20 and rotating drum 21 is sealed, liquid containing particulate can flow through interface 25 as shown by the dotted line, into the interior of housing 20. To prevent such flow an encapsulated felt of the invention can be placed around the entire circumferential interface, as shown in FIGS. 7 and 8 where the encapsulated felt is shown as 26. The felt effectively seals off the interior of housing 20 from the interior of drum 21.

The felt sealant is held in place by a vacuum in chamber 20 and by bolted spring 28. The felt provides an effective sliding seal. To enhance the sealing capability, vacuum ports are sometimes designed into the wall of chamber 20 under the felt to enhance sealing effectiveness.

EXAMPLE

An assembly of 17 layers of needle punched felt made of porous expanded PTFE staple fiber, each felt layer being about 40 mils thick, about 28 inches wide and 30 feet long and each felt layer having in it a scrim of woven porous expanded PTFE fiber, was used. The assembly was needle punched to provide cohesiveness.

A portion was cut into 2 inch wide by 6 inch long units. A sheet of expanded porous PTFE membrane, laminated on one side with a film of a copolymer of tetrafluoroethylene and hexafluoropropylene to make a 5 mil thick tape was spirally wrapped around the entire unit and each end sealed to obtain an encapsulated assembly.

The assembly was tested for its impermeability to fluids by placing it in a test device which subjected all sides to water except the underside. The underside was subjected to a vacuum of 15 inches mercury. After 1½ hours, no water had penetrated through the assembly and into the vacuum area. In contrast, a 17 layer batt that was not encapsulated by the wrap of laminated sheet allowed water to pass through at a rate of 4 gallons/foot$^2$/minute.

I claim:

1. A sealing material of polytetrafluoroethylene felt encapsulated in a tape of polytetrafluoroethylene having a layer of thermoplastic fluorinated polymer on one side of said tape, said tape having the thermoplastic fluorinated polymer adjacent the felt.

2. A sealing material of claim 1 wherein the felt is porous polytetrafluoroethylene.

3. A sealing material of claim 1 wherein the tape is porous polytetrafluoroethylene.

4. A sealing material of claim 3 wherein the felt is porous polytetrafluoroethylene.

5. A sealing material of claim 1, 2, 3 or 4 wherein the thermoplastic fluorinated polymer is a copolymer of tetrafluoroethylene and hexafluoropropylene.

6. A sealing material of claim 1, 2, 3 or 4 wherein the tape is wrapped helically around the felt.

7. A sealing material of claim 5 wherein the tape is wrapped helically around the felt.

8. A sealing material of claims 1, 2, 3 or 4 wherein the felt contains a scrim.

9. A sealing material of claim 6 wherein the felt contains a scrim.

* * * * *